United States Patent
Furuta

(10) Patent No.: US 7,515,302 B2
(45) Date of Patent: Apr. 7, 2009

(54) INFORMATION PROCESSING SYSTEM

(75) Inventor: Seiichi Furuta, Anjo (JP)

(73) Assignee: DENSO CORPORATION, Kariya (JP)

( * ) Notice: Subject to any disclaimer, the term of this patent is extended or adjusted under 35 U.S.C. 154(b) by 708 days.

(21) Appl. No.: 10/941,987

(22) Filed: Sep. 16, 2004

(65) Prior Publication Data

US 2005/0075759 A1 Apr. 7, 2005

(30) Foreign Application Priority Data

Sep. 18, 2003 (JP) ............................. 2003-326619

(51) Int. Cl.
*G06K 15/00* (2006.01)
*G06K 1/00* (2006.01)
*G06F 15/00* (2006.01)
*G06F 3/12* (2006.01)

(52) U.S. Cl. .................................... 358/3.06; 358/1.13

(58) Field of Classification Search ................ 358/3.06; 715/769; 713/185; 701/1
See application file for complete search history.

(56) References Cited

U.S. PATENT DOCUMENTS

| 5,091,856 | A | 2/1992 | Hasegawa et al. | |
|---|---|---|---|---|
| 5,991,798 | A | 11/1999 | Ozaki et al. | |
| 6,198,996 | B1 | 3/2001 | Berstis | |
| 6,610,105 | B1 | 8/2003 | Martin, Jr. et al. | |
| 7,142,696 | B1 | 11/2006 | Engelsberg et al. | |
| 2002/0059593 | A1 * | 5/2002 | Shao et al. | 725/37 |
| 2002/0069360 | A1 * | 6/2002 | Thoone et al. | 713/185 |
| 2006/0218501 | A1 * | 9/2006 | Wilson et al. | 715/769 |

FOREIGN PATENT DOCUMENTS

| JP | A-10-264739 | 10/1998 |
|---|---|---|
| JP | A-11-327723 | 11/1999 |
| JP | A-11-334180 | 12/1999 |
| JP | A-2000-251396 | 9/2000 |

(Continued)

OTHER PUBLICATIONS

Second Office Action from Chinese Patent Office issued on Jul. 10, 2006 for the corresponding Chinese patent application No. 2004100786557 (and English translation thereof).

Notice of Final Rejection from Korean Patent Office issued on Aug. 28, 2006 for the corresponding Korean patent application No. 10-2004-0074631 (and English translation thereof).

(Continued)

*Primary Examiner*—Douglas Q Tran
(74) *Attorney, Agent, or Firm*—Posz Law Group, PLC

(57) ABSTRACT

An information processing system includes a management device mounted on a vehicle, and a terminal device outside the vehicle. The management device performs as follows: obtaining as identification information of a user a user ID and a password from the terminal device; selecting, based on the identification information obtained, a display target of items and device information to be preferentially displayed on a display device of the terminal display; collecting device information corresponding to the display target from devices (e.g., door ECU) in the vehicle; and generating system information storing information relating to the items selected and the device information collected. The management device then causes, by sending the system information generated to the terminal device, the terminal device to hierarchically display the display target in a tree form on the display device of the terminal device.

11 Claims, 14 Drawing Sheets

FOREIGN PATENT DOCUMENTS

| | | |
|---|---|---|
| JP | A-2001-222271 | 8/2001 |
| JP | A-2001-23897 | 9/2001 |
| JP | A-2002-012099 | 1/2002 |
| JP | A-2002-162233 | 6/2002 |
| JP | A-2002-368876 | 12/2002 |
| JP | A-2003-167792 | 6/2003 |
| WO | WO 01/99032 | 12/2001 |

OTHER PUBLICATIONS

First Office Action issued from Chinese Patent Office issued for the corresponding Chinese patent application No. 2004100786557 (and English translation thereof).

Office Action mailed Aug. 19, 2008 in corresponding Japanese patent application No. 2003-326619 (and English translation).

Office Action dated Dec. 2, 2008 in corresponding Japanese Application No. 2003-326619 (and English Translation).

* cited by examiner (3rd RESPONSE)

(4th RESPONSE)

INFORMATION PROCESSING SYSTEM

CROSS REFERENCE TO RELATED APPLICATIONS

This application is based on and incorporates herein by reference Japanese Patent Application No. 2003-326619 filed on Sep. 18, 2003.

FIELD OF THE INVENTION

The present invention relates to an information processing system for displaying, on a display device, information relating to devices mounted on a vehicle.

BACKGROUND OF THE INVENTION

Conventionally, it is known that a data file, etc. is hierarchically displayed in a tree form. For example, an information processing device (personal computer or the like) stores a file system for managing by classifying a data file using a root directory and its lower layer sub-directory. In this device, when a symbol (icon) indicating a root directory that is displayed on a monitor is selected using a pointing device, a symbol indicating a sub-directory is displayed such that it branches from the symbol indicating the root directory. Further, when the symbol indicating the sub-directory is selected using the pointing device, names or the like of a data file that is stored in the sub-directory are displayed on the monitor.

Furthermore, in recent years, multiple information processing devices are interconnected via a network; here, data files of the devices are often shared by the multiple devices. In each of these information processing devices, symbols of the data files stored in other devices are hierarchically displayed along with those stored in the own (e.g., see JP-H10-021042 A (U.S. Pat. No. 5,991,798)).

Meanwhile, vehicles (in particular, automobiles) are increasing in recent years, the vehicles that have: in-vehicle information devices communicating with the Internet, such as an audio device and a navigation device; or devices for achieving safety and comfort within the vehicles such as an anti-theft device and an emergency call device. Information and functions within the vehicles are thereby diversified.

Derived from the above background, the vehicles become to include various mixed information such as: vehicular information having a high privacy level; necessary information for maintaining the vehicle; and entertainment information of image data, music data, etc. Under the state of the various mixed information co-existing, when information included in the vehicle is displayed, several problems arise. Namely, much information unnecessary for a user is displayed; further, information unsuitable for a specific user is displayed for the specific user.

Furthermore, also in recent years, music data or the like is transferred from a personal computer located at home to a hard disk drive of an audio device mounted in a vehicle using a portable storage medium such as a memory card. However, it is unfavorable for a user to transfer data using the memory card having the much less data volume than the hard disk drive, so that improvement is being expected.

SUMMARY OF THE INVENTION

It is an object of the present invention to provide an information processing system capable of changing a displaying form that displays information relating to in-vehicle devices depending on a situation of a user such as a vehicle owner or a service person. It is another object to provide an information processing system capable of easily importing, into an in-vehicle device, various data such as music data stored in a storage medium outside a vehicle. Further, it is another object to provide an information processing system enabling a user to easily manipulate an in-vehicle device based on information displayed on a display device outside the vehicle.

To achieve the above objects, an information processing system for displaying, on a display device, device information relating to devices mounted on a vehicle is provided with the following. Identification information of a user is obtained. A display target to be displayed on the display device is selected based on the identification information of the user obtained. Device information corresponding to the display target is selected from the vehicle. The display device is caused to hierarchically display the device information collected, by hierarchically classifying the device information collected.

According to the information processing system, a display form for device information can be changed based on a standpoint of a user such as a vehicle owner, and a service person, so that the device information unnecessary or inappropriate for showing the user is not displayed on the display device. Further, the device information is displayed in a hierarchical structure, so that the devices within the relevant vehicle can be easily shown to the user.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
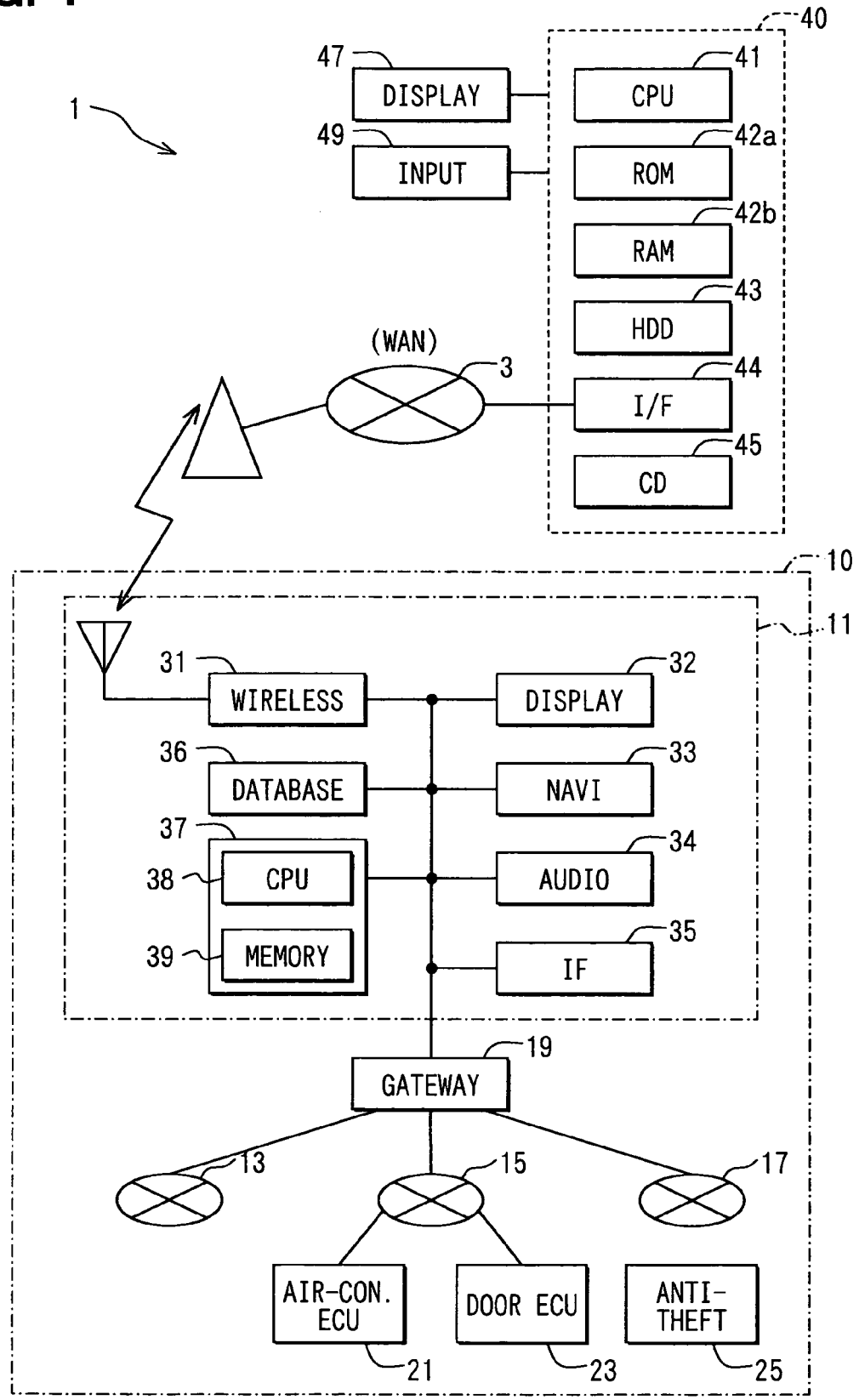
FIG. 1 is a block diagram showing a structure of an information processing system to which the present invention is directed.

The present invention is directed to an information processing system 1, a structure of which is shown in FIG. 1. The system 1 mainly includes an in-vehicle network 10 mounted in a vehicle and a terminal device 40 that is communicably connected with the in-vehicle network 10 that includes various in-vehicle devices (or devices within the vehicle).

The in-vehicle network 10 is constructed of multiple networks such as an information system network 11, a power train system network 13, a body system network 15, and a safety system network 17. The information system network 11 is interconnected with other networks 13 to 17 via a gateway device 19.

The power train system network 13 includes ECUs relating to vehicle traveling such as an engine ECU (not shown) controlling an engine. The body system network 15 includes an air-conditioner ECU, a door ECU, etc. The safety system network 17 includes various ECUs for aiming at vehicle safety, anti-theft, etc. such as an antitheft device 25.

The gateway device 19 is a known gateway preventing unauthorized accesses to the networks 13 to 17, while mediating communications between the networks 13 to 17. Further, the gateway device 19 is communicably connected with a wide area network 3 via the information system network 11, while communicably connected with the power train system network 13, the body system network 15, and the safety system network 17 in its terminal ends.

The information system network 11 includes in-vehicle devices as follows: a wireless communications device 31 communicating with an external terminal device 40 via the wide area network 3; a display device 32 such as a liquid crystal display; a navigation device 33 retrieving a route to a destination based on map data to assist a vehicle occupant by notifying the route, e.g., via the display device 32; an audio device 34 reproducing music data or music CD; a user interface 35 obtaining manipulation information from the vehicle occupant to provide it to devices within the information system network 11; a database device 36 storing data files that include the map data used in the navigation device 33 and the music data reproduced in the audio device 34; and a management device 37 causing the devices (e.g., ECUs) within the vehicle to execute a given process according to a request signal sent from the terminal device 40, while providing system information or file information of the database device 36 for the terminal device 40 communicably connected with the information system network 11 via the wide area network 3.

The information system network 11 can be constructed to integrate the devices 31 to 36 into the management device 37 as a single unit. In this embodiment, the management device 37 is constructed to manage as a whole data within the database device 36.

By contrast, the terminal device 40 is constructed to be similar with a known personal computer, including a CPU 41 performing various computation processing; a ROM 42$a$ storing programs, etc.; a RAM 42$b$ used as a storage area during computation processing; a hard disk drive (HDD) 43 storing various data (music data, etc.); a communications (LAN) interface 44 communicating with the wireless communications device 31 within the in-vehicle network 10 via the wide area network 3; and a CD drive 45. Further, the terminal device 40 is connected with a display device 47 including a liquid crystal display; and an input device 49, as a manipulating unit, including a keyboard and a pointing device (e.g., mouse).

Figure 2A:
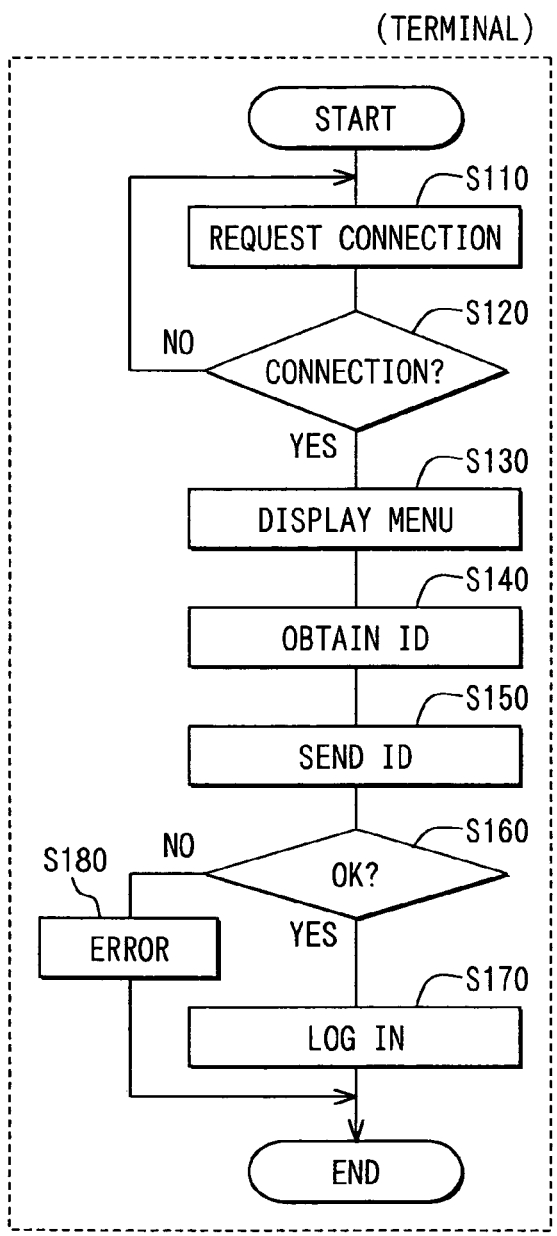
FIG. 2A is a flow chart diagram showing a connection process executed by a terminal device.

The terminal device 40 constructed as the above-described tries to connect with the management device 37 by executing a connection process shown in FIG. 2A when a connection request signal from the input device 49 to the management device 40 is outputted by the manipulation of the user.

Figure 2B:
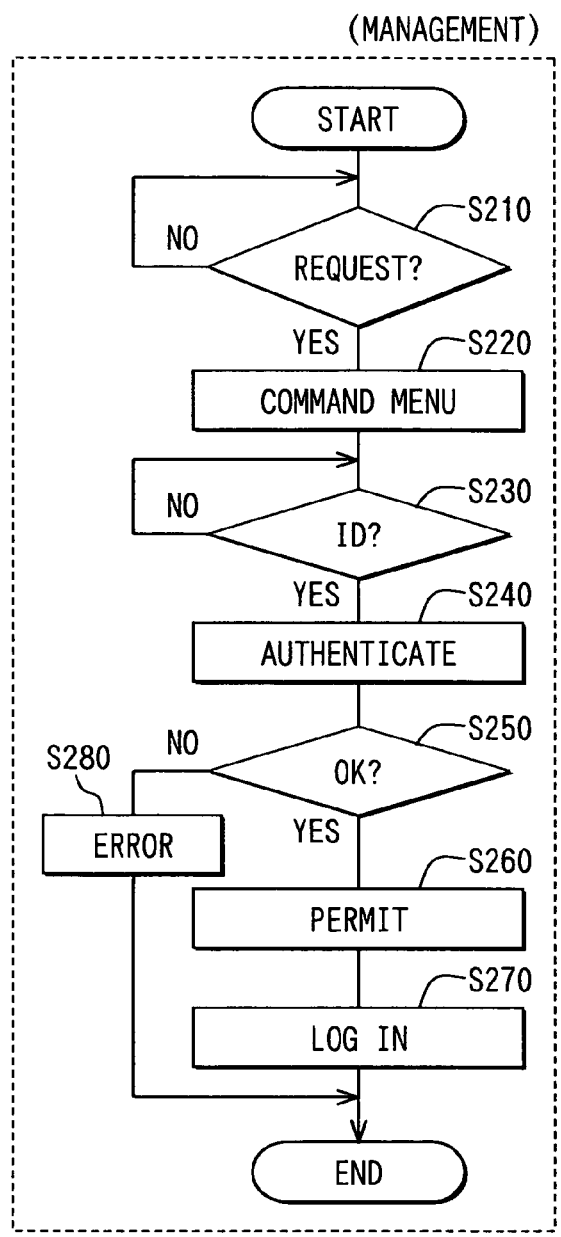
FIG. 2B is a flow chart diagram showing a connection process executed by a management device.
Figure 3A:
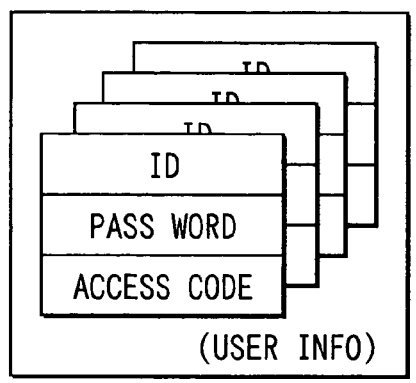
FIG. 3A is a diagram explaining a structure of user information used in an authentication in a management device.
Figure 3B:
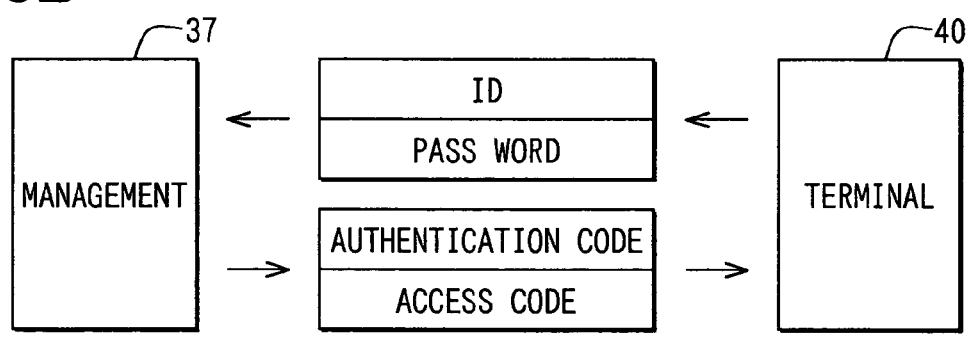
FIG. 3B is a diagram explaining a structure of a communications between a terminal device and a management device at a connection process.

The process in FIG. 2A is executed by the CPU 41 of the terminal device 40, while FIG. 2B, by the CPU 38 of the management device 37. Further, the structure in FIG. 3A is of user information used in an authentication by the management device 37, while FIG. 3B, of a communications between the terminal device 40 and the management device 37.

Upon starting the connection process, the CPU 41 of the terminal device 40 sends a connection request signal to the management device 37 of the in-vehicle network 10 via the communications interface 44 (S110). Next, it is determined whether a response to the connection request is received from the management device 37 (S120). When it is determined that the response is not received (NO at S120), the connection request is repeatedly sent to the management device 37; conversely, when it is determined that the response is received (YES at S120), a log-in menu is displayed on the display device 47 at S130.

This log-in menu has an input area for a user ID and password. When the user inputs the user ID and password on the input area of the log-in menu through the input device 49, the CPU 41 of the terminal device 40 obtains the information inputted (S140). The CPU 41 then sends a signal storing the user ID and password inputted, to the management device 37 via the communications interface 44.

Figure 4A:
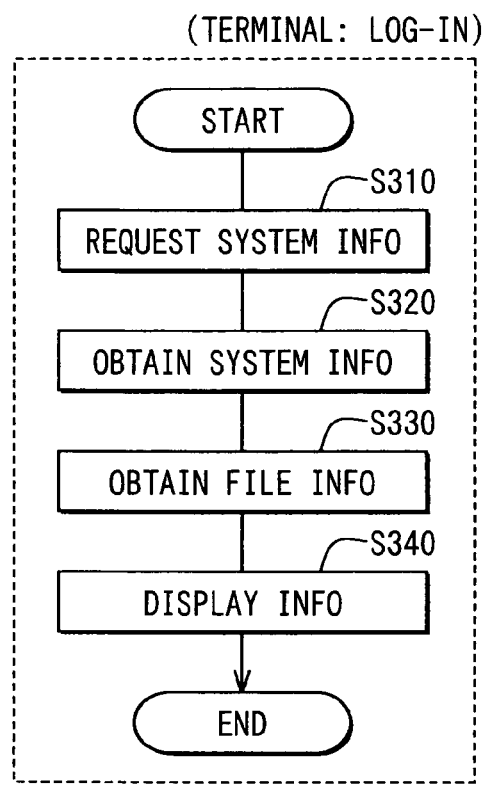
FIG. 4A is a flow chart diagram showing a log-in process executed by a terminal device.

Upon receiving a signal indicating a permission of use from the management device 37, the CPU 41 determines "YES" at S160 to thereby execute a log-in process shown in FIG. 4A (S170). By contrast, the CPU 41 determines that an authentication for the user fails (NO at S160), an error process is executed at S180. The process is then terminated.

In concert with the connection process of the terminal device 40, the CPU 38 of the management device 37 executes the process shown in FIG. 2B. Upon starting the connection process shown in FIG. 2B, the CPU 38 of the management device 37 waits until the connection request signal is sent from the terminal device 40 (S210). Then upon receiving the connection request signal via the wireless communications device 31 (YES at S230), an authentication process is executed. Here, the user ID and password received is collated with user information (user ID and password) previously stored in a memory 39 (e.g., ROM, RAM) of the device 37 to thereby determine whether a user who manipulates the terminal device 40 is a user who is previously permitted to access the management device 37 (S240). Further, the user information registered in the memory 39 is constructed to have a structure as shown in FIG. 3A. Namely, the memory 39 stores the user information that includes user IDs, passwords, and access codes indicating user groups with respect to the respective users.

When, as a result of the authentication, the user ID and password received accord with those of the user information registered, the CPU 38 of the management device 37 determines that the user who manipulates the terminal device 40 is the user who is permitted to access the management device 37, i.e., YES at S250. A permission signal indicating permission of use is thereby sent to the terminal device 40 (S260). In addition, at the same time, an authentication code that is used for confirming that the terminal device 40 is successfully authenticated in the subsequent accesses, and an access code indicating a user group are notified the terminal device 40 (see FIG. 3B). The CPU 38 of the management device 37 then executes a log-in process shown in FIG. 4B (S270). By contrast, when the user ID and/or password received do not accord with those of the user information registered, the CPU 38 of the management device 37 determines NO at S250, thereby sending a signal indicating an authentication failure as an error process (S280). The process is then terminated.

Figure 4B:
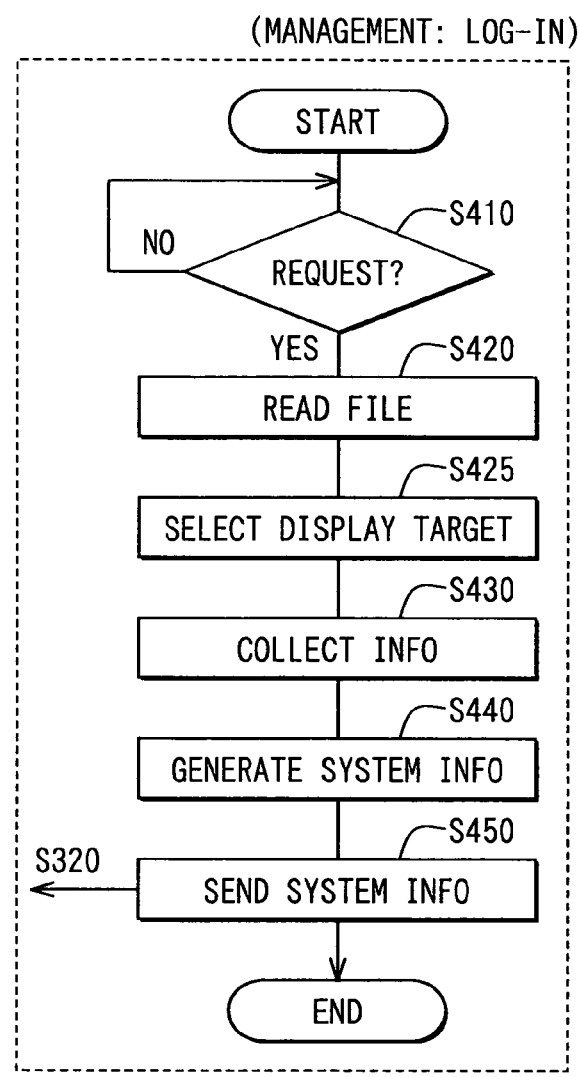
FIG. 4B is a flow chart diagram showing a log-in process executed by a management device.
Figure 5A:
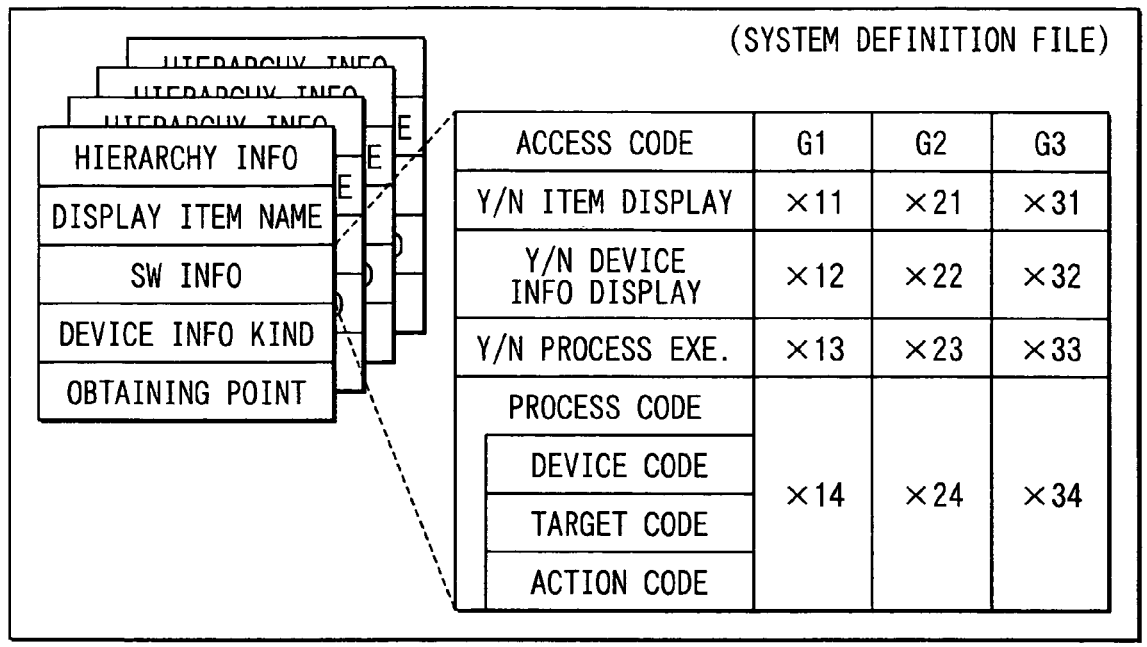
FIG. 5A is a diagram explaining a structure of a system definition file.
Figure 5B:
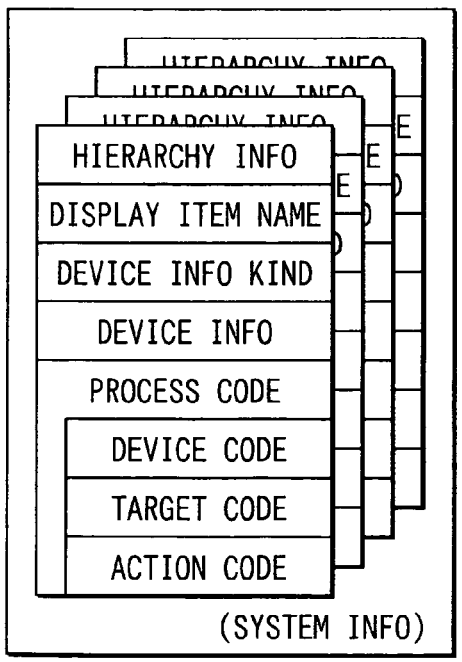
FIG. 5B is a diagram explaining a structure of system information.

In the next place, using FIGS. 4A, 4B, log-in processes executed by the terminal device 40 and the management device 37 will be explained below. Here, flow charts in FIGS. 4A and 4B indicate log-in process executed by the CPU 41 of the terminal device 40 and the CPU 38 of the management device 37, respectively. Further, a diagram in FIG. 5A explains a structure of a system definition file used during the log-in process by the management device 37. A diagram in FIG. 5B explains a structure of system information exchanged between the terminal device 40 and the management device 37 during the log-in process. Moreover, a diagram in FIG. 5C explains a structure of file information.

Upon starting the log-in process, the CPU 41 of the terminal device 40 sends a request signal for system information relating to the in-vehicle network 10, to the management device 37 (S310). The CPU 41 then obtains the system information of the structure shown in FIG. 5B that is sent from the management device 37 in response to the request signal.

Figure 5C:
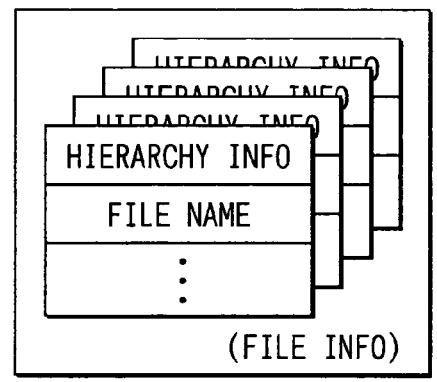
FIG. 5C is a diagram explaining a structure of file information.

The CPU 41 of the terminal device 40 then obtains file information shown in FIG. 5C that is a list of data files stored in the hard disk drive 43 built in the terminal device 40 (S330). The CPU 41 then executes an information display process shown in FIG. 6A, hierarchically displaying the information (system information and file information) on the display device 47 (S340). The file information includes hierarchy information such as a directory name and information relating to a file name with respect to each data file stored in the hard disk drive 43.

By contrast, upon starting the log-in process, the CPU 38 of the management device 37 waits until a request signal for the system information is sent from the terminal device 40 (S420). Upon receiving the request signal for the system information (YES at S410), the CPU 38 reads out the system definition file (S410), selecting a display target of items and device information that are to be preferentially shown on the display device 47 based on the contents of the system definition file (S425). The device information corresponding to the display target selected is then obtained based on an obtaining point that is a point to be reached for obtaining the corresponding device information and is described in the system definition file (S430). Here, the device information includes information indicating an operation state of a relevant device and information indicating a data file which the relevant device can read.

The system definition file includes, with respect to each of items hierarchically displayed, hierarchy information; a display item name; switch information for switching items displayed and processes according to a user; a kind of device information displayed while being related with the item; and a obtaining point that is to be reached for obtaining the device information. The device information includes information indicating ON/OFF of a relevant device; information of a data file which the relevant device can read, so that the column of the kind of the device information in the system definition file includes codes identifying the foregoing information.

The system definition file includes, as the above switch information, with respect to each user group, a setting (permitted/unpermitted) of display of the device information; a setting (permitted/unpermitted) of execution of process related with the item; information relating to a process code indicating the process. The process code further includes a device code indicating a device executing the process; a target code relating to a target to be processed; an action code indicating a kind of a process to be executed. Selection of the display target at S425 is performed based on the information relating to the setting (permitted/unpermitted) of display of item and the information relating to the setting (permitted/unpermitted) of display of device information described in the system definition file.

Upon obtaining the device information from the obtaining point based on the above-described system definition file (S430), the CPU 38 of the management device 37 generates, based on the switch information according to the group of the user presently under the log-in process, system information including hierarchy information, a display item name, a device information kind, contents of the information obtained, and a process code of the group of the user, with respect to each item that can be displayed (S440). This system information is then sent to the terminal device 40. The CPU 38 of the management device 37 then terminates the log-in process. When the setting (permitted/unpermitted) of execution of the process is set to "unpermitted" in the relevant group, the process code is represented as "nil." Similarly, when the setting (permitted/unpermitted) of display of the device information is set to "unpermitted" in the relevant group, the device information is represented as "nil."

Figure 6A:
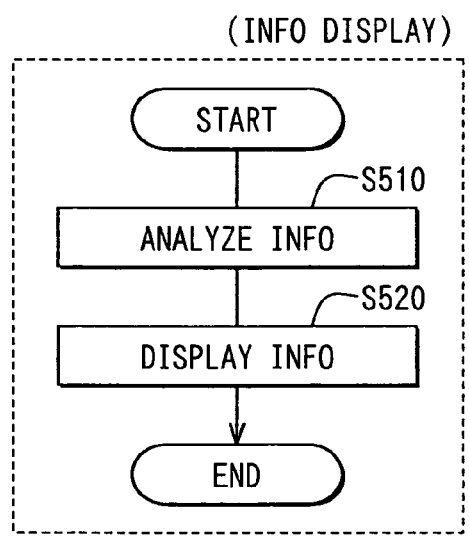
FIG. 6A is a flow chart diagram showing an information display process executed by a terminal device.

In the next place, using a flow chart diagram in FIG. 6A, the information display process will be explained below. The information display process is executed by the CPU 41 of the terminal device 40.

Figure 7A:
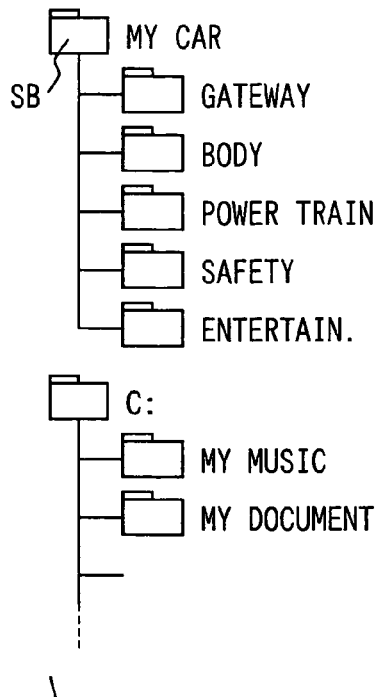
FIGS. 7A, 7B are diagrams showing display examples of system information.
Figure 7B:
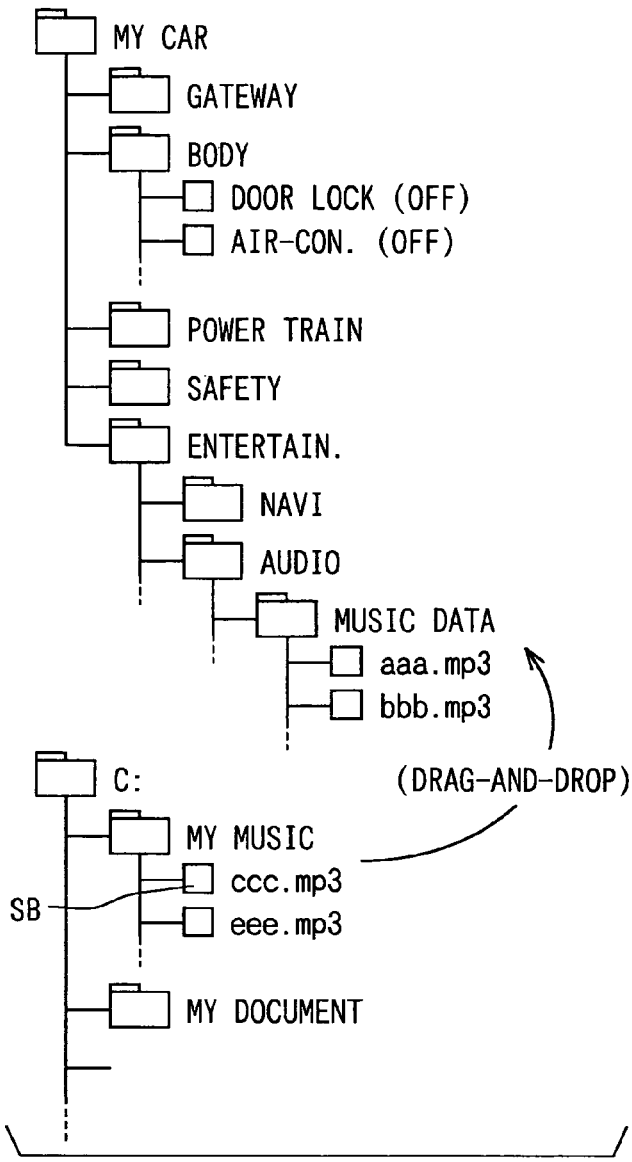

Upon starting the information display process, the CPU 41 of the terminal device 40 analyzes the file information obtained and system information obtained (S510). The display item names, the file names, etc. are thereby classified according to the hierarchy information described in each information to be shown as a tree on the display device 47 (S520), as shown in FIGS. 7A, 7B.

The CPU 41 of the terminal device 40 displays a symbol SB named "My Car" and its lower layered symbols SB named "Gateway," "Body," "Power Train," "Safety," "Entertainment," such that the lower layered symbols branch from the symbol named "My Car" on the display device 47. Further, the hard disk drive 43 has a C drive/root directory, under which "My Music," and "My Document" are located and displayed on the display device 47 such that they are located in the same column as that of "Gateway."

Figure 7C:
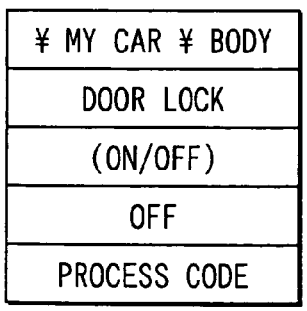
FIGS. 7C, 7D are diagrams showing display examples of file information.

When "Body" symbol is clicked by the pointing device or the like, a symbol of "Door Lock" is shown to be located under the symbol of "Body." Further, a door state ("ON"/ "OFF") is shown as the device information of the door at the end of the item name of "Door Lock" within parentheses on the display device 47. Here, the system information corresponding to the item of "Door Lock" is described, e.g., as shown in FIG. 7C.

Figure 7D:
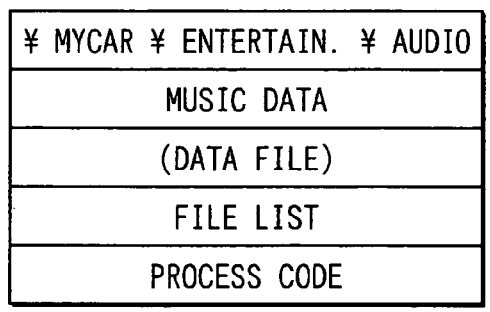

The symbol of "Audio" under "Entertainment" layer is clicked, so that a list of music data able to be reproduced by the audio device 34 is shown as the device information of the audio device 34 on the display device 47. Here, the system information corresponding to the item of "Music Data" is described, e.g., as shown in FIG. 7D.

Meanwhile, the CPU 41 of the terminal device 40 displays, based on the system information, items relating to the gateway device 19 under "Gateway"; items and device information both relating to the devices constituting the power train system network 13, under "Power Train"; further, items relating to the devices constituting the safety system network 17 such as ON/OFF state of the anti-theft device 25 as the device information, under "Safety."

When "My music" symbol is clicked by the pointing device or the like, the symbols of data items stored under the directory "My Music" are displayed with respect to the individual data items as shown in FIG. 7B. In this embodiment, each time being clicked, layer names/item names in the lower layer are displayed; however, the entire layers can be hierarchically displayed in a tree structure from the beginning.

In this embodiment, the management device 37 generates the system information according to an access code of the user who activates the log-in process (S440), then sending it to the terminal device 40 (S450). Therefore, the terminal device 40 has different display forms which are switched depending on a user, which will be explained using FIGS. 8A, 8B.

Figure 8A:
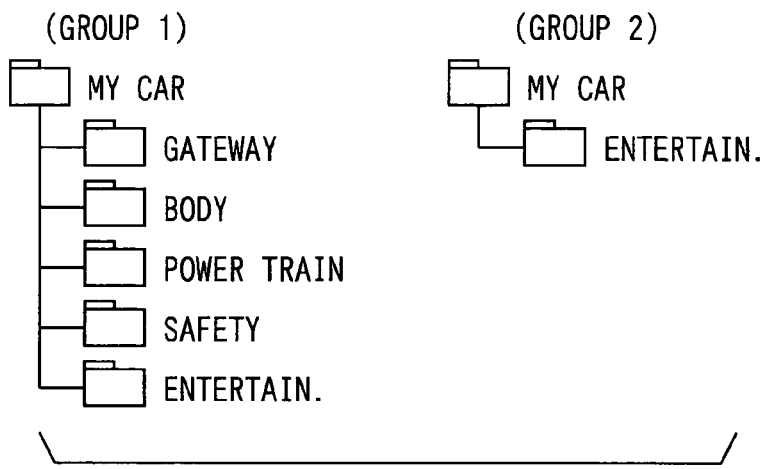
FIGS. 8A, 8B are diagrams showing display examples of system information.

With respect to a user group whose setting (permitted/unpermitted) of display is set to is set to "permitted" in the entire items, all symbols of "Gateway," "Body," "Power Train," "Safety," and "Entertainment" are displayed on the display device 47, as shown in the left side in FIG. 8A. Further, manipulating the pointing device displays the items located under the relevant symbol and related device information.

By contrast, with respect to a user group whose setting (permitted/unpermitted) of display is set to is set to "unpermitted" in the items under each of items of "Gateway," "Body," "Power Train," and "Safety" in the system definition file, information (display item name, device information) pertinent to the items is not included in the system information received. As shown in the right side in FIG. 8A, the display device 47 does not display: certain items whose display setting is set to "unpermitted"; their related device information; the symbols located in the layer higher than the certain items. Namely, on the display device 47, the items and device information whose display setting are set to "permitted," and their higher-layered "Entertainment" are selectively displayed.

Figure 8B:
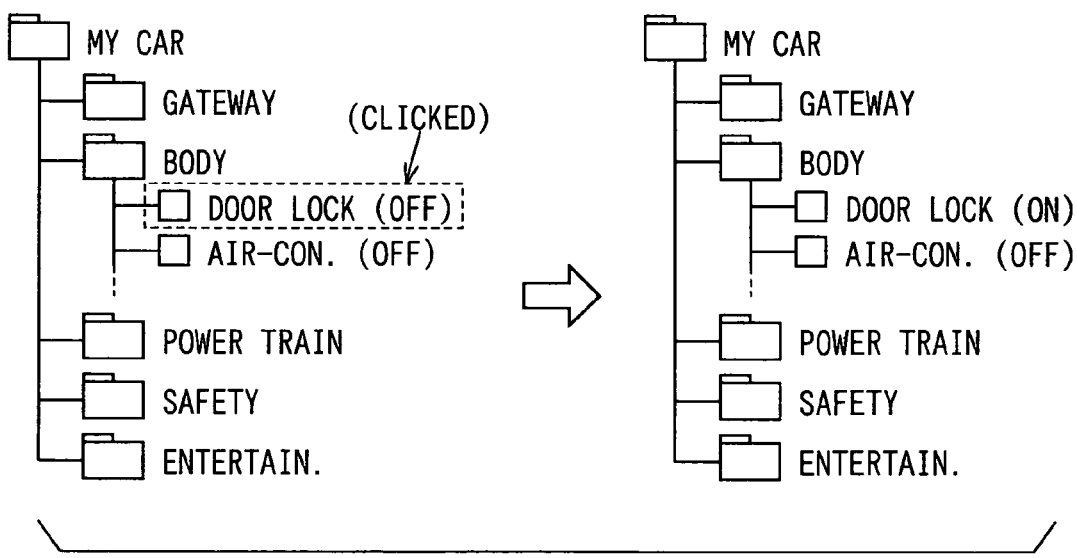
Figure 9A:
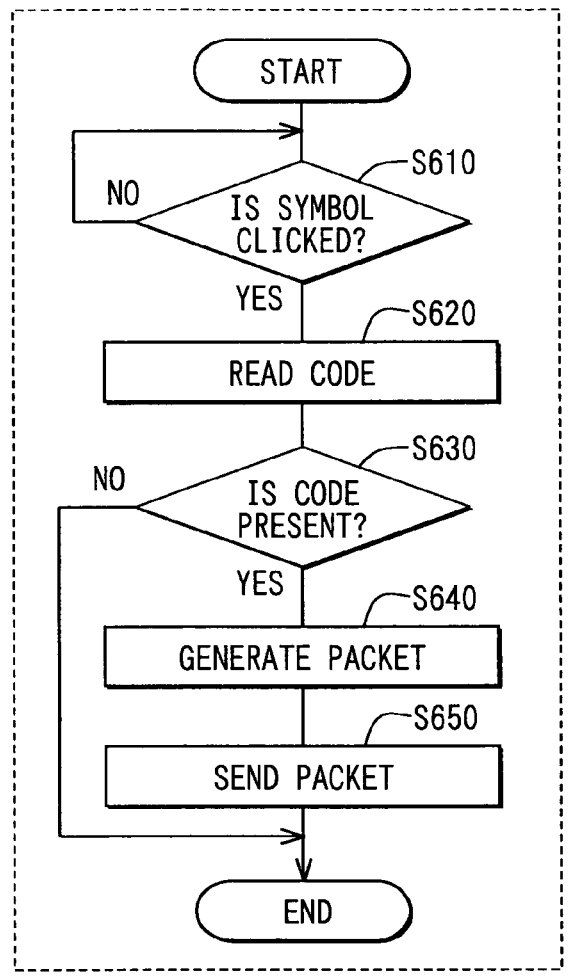
FIG. 9A is a flow chart diagram showing a first request process executed by a terminal device.
Figure 9B:
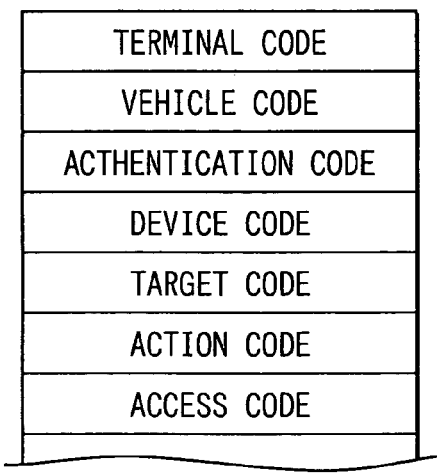
FIG. 9B is a diagram explaining a structure of a process request packet.

Further, as shown in FIG. 8B, when a symbol of item displayed is clicked, the CPU 41 of the terminal device 40 sends a process code relating to the item displayed based on the system information. This causes a relevant device within the vehicle to execute a given process corresponding to the process code, then causing the management device 37 to send back the response code as a result of the given process. The CPU 41 thereby updates device information upon which the result of the given process is reflected, displaying it on the display device 47. Here, an update of device information by clicking the item displayed is shown in FIG. 8B. Furthermore, FIG. 9A is a flow chart diagram showing a first request process executed by a terminal device 40; FIG. 9B is a diagram explaining a structure of a process request packet.

Upon starting the first request process, the CPU 41 of the terminal device 40 waits until a symbol of item displayed is clicked via the pointing device (S610). When it is determined that the symbol is clicked (YES at S610), the process code related with the symbol clicked is read out (S620). Here, when the process code is "nil," it is determined to be "NO" at S630, which terminates the first request process.

By contrast, when the CPU 41 of the terminal device 40 succeeds in reading out the process code, it is determined to be "YES" at S630, which generates a process request packet whose structure is shown in FIG. 9B (S640) to then send it to the management device 37 via the communications interface 44 (S650). This process request packet includes: a terminal code being a unique code previously assigned to the terminal device 40; a vehicle code being a unique code assigned to a vehicle accommodating the management device 37; the above-described authentication code and access code; and three codes of a device code, target code, and action code, the three which constitute the process code.

Figure 10:
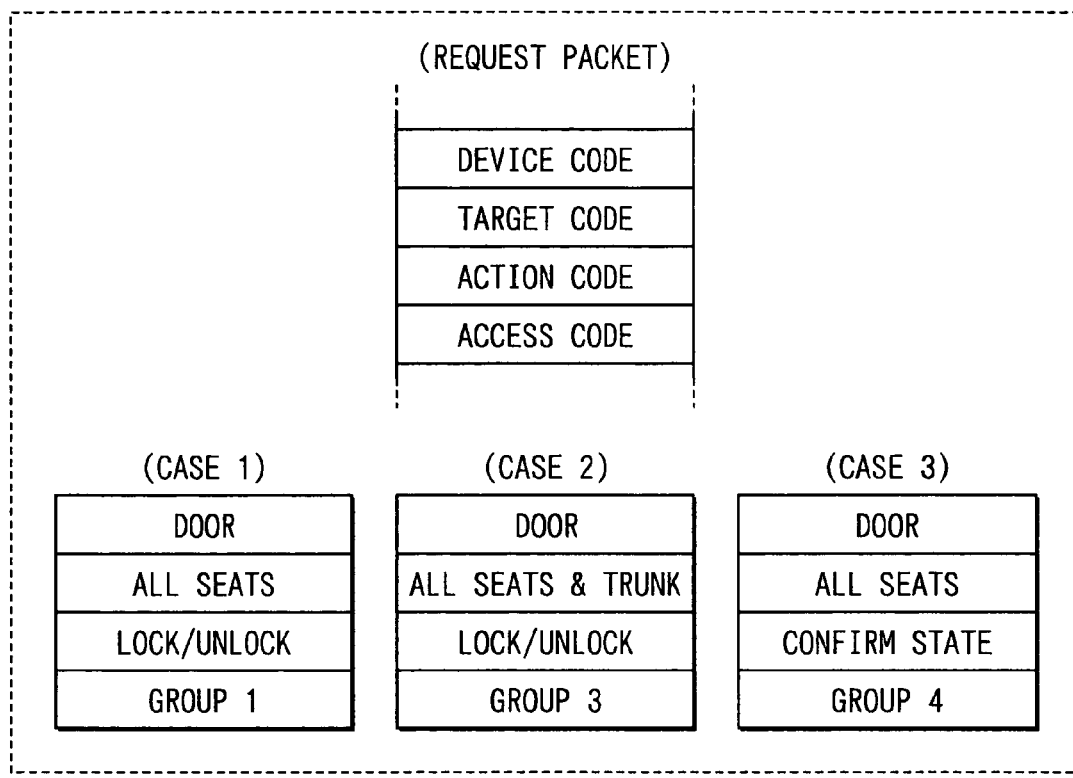
FIG. 10 is a diagram showing a specific example of a process request packet.

In this embodiment, as explained above, since the system information according to a user who logs in the system is sent from the management device 37, the terminal device 40 generates and sends the process request packet including the process code differentiated by a user group even when the same item displayed is clicked. The process based on the user group is thereby executed by an in-vehicle device within the vehicle. Specific examples of this are shown in FIG. 10.

It is supposed that, with respect to a user group 1, a system definition file includes, as a process code of item displayed "Door Lock," a process code causing the door ECU 23 to execute lock and unlock of the entire seat doors. Here, when a symbol of item displayed of "Door Lock" is clicked, the terminal device 40 generates a process request packet storing the process code of the user group 3 (CASE 1 in FIG. 10) described in the system information, causing the door ECU 23 to execute lock or unlock of the entire seat doors.

Further, it is supposed that, with respect to a user group 3, a system definition file includes, as a process code of item displayed "Door Lock," a process code causing the door ECU 23 to execute lock and unlock of the entire seat doors and the trunk. Here, when a symbol of item displayed of "Door Lock" is clicked, the terminal device 40 generates a process request packet storing the process code of the user group 3 (CASE 2 in FIG. 10) described in the system information, causing the door ECU 23 to execute lock or unlock of the entire seat doors and the trunk.

Furthermore, it is supposed that, with respect to a user group 4, a system definition file includes, as a process code of item displayed "Door Lock," a process code causing the door ECU 23 to monitor the states of the entire seat doors. Here, when a symbol of item displayed of "Door Lock" is clicked, the terminal device 40 generates a process request packet storing the process code of the user group 3 (CASE 3 in FIG. 10) described in the system information, causing the door ECU 23 to reply the states (lock and unlock) of the entire seat doors by monitoring them.

Figure 11:
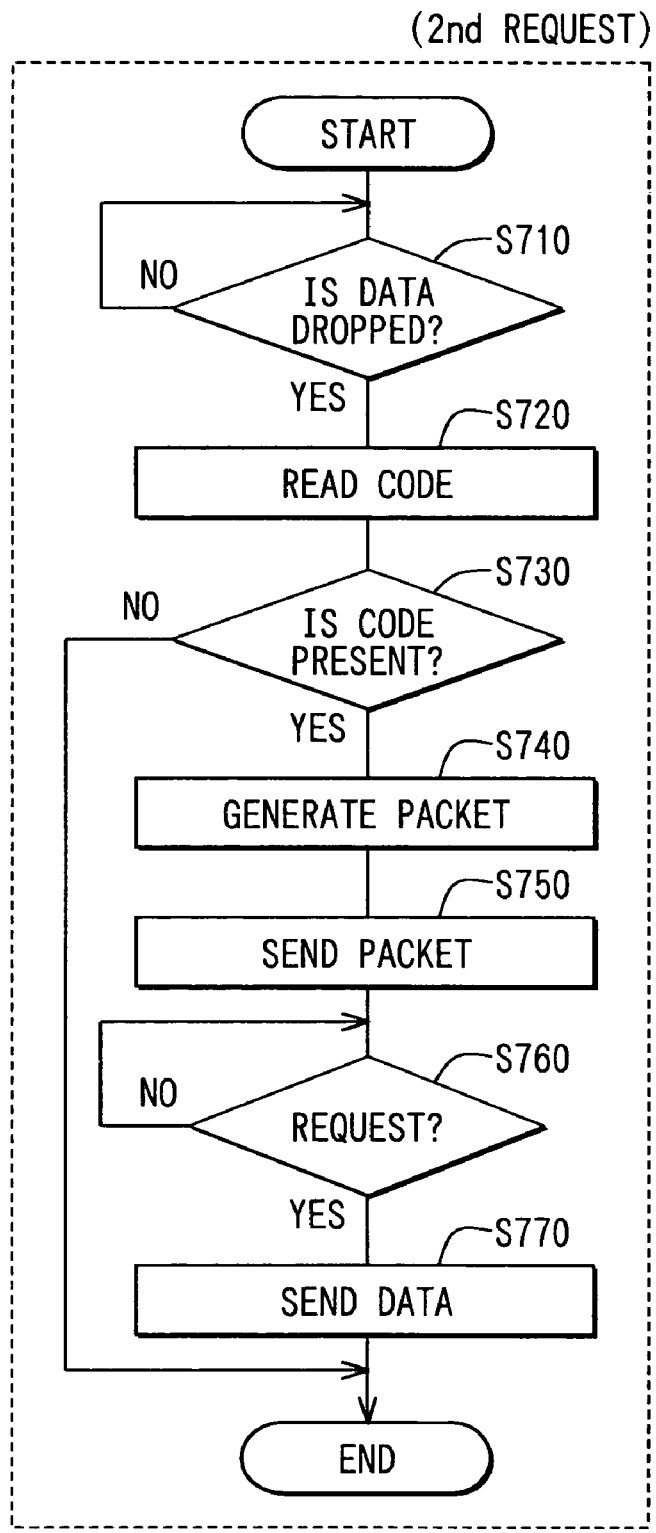
FIG. 11 is a flow chart diagram showing a second request process executed by a terminal device.

In the next place, when a symbol of data file is dropped on a symbol of item displayed, the CPU 41 of the terminal device 40 provides a certain device within the in-vehicle network 10 with the relevant data file and causes the certain device to execute the process corresponding to the process code using the data file dropped. FIG. 11 is a flow chart diagram showing this second request process executed by a terminal device 40.

Upon starting the second request process, the CPU 41 of the terminal device 40 determines whether a symbol of a data file (e.g., ccc.mp3 in FIG. 7B) that is stored in the hard disk drive built in the terminal device 40 is dropped on a symbol of item displayed on the screen on the display device 47 (S710). When being dropped is determined (YES at S710), the process code related with the symbol of item displayed is read out from the system information (S720). Here, when the process code is "nil," it is determined to be "NO" at S730, which terminates the second request process.

By contrast, when the CPU 41 of the terminal device 40 succeeds in reading out the process code, it is determined to be "YES" at S730, which generates a process request packet having the above structure (S740) to then send it to the management device 37 via the communications interface 44 (S750). For example, a process request packet is generated and sent for causing the management device 37 to register the data file dropped into a given directory of the database device 36.

Thereafter, the CPU 41 of the terminal device 40 waits until a request signal for the data file is sent from the management device 37 (S760). Upon receiving the request signal for the file data via the communications interface 44 to thereby determine "YES" at S760, the CPU 41 of the terminal device 40 sends the relevant data file dropped to the management device 37 (S770), which then terminates the second request process.

Figure 12:
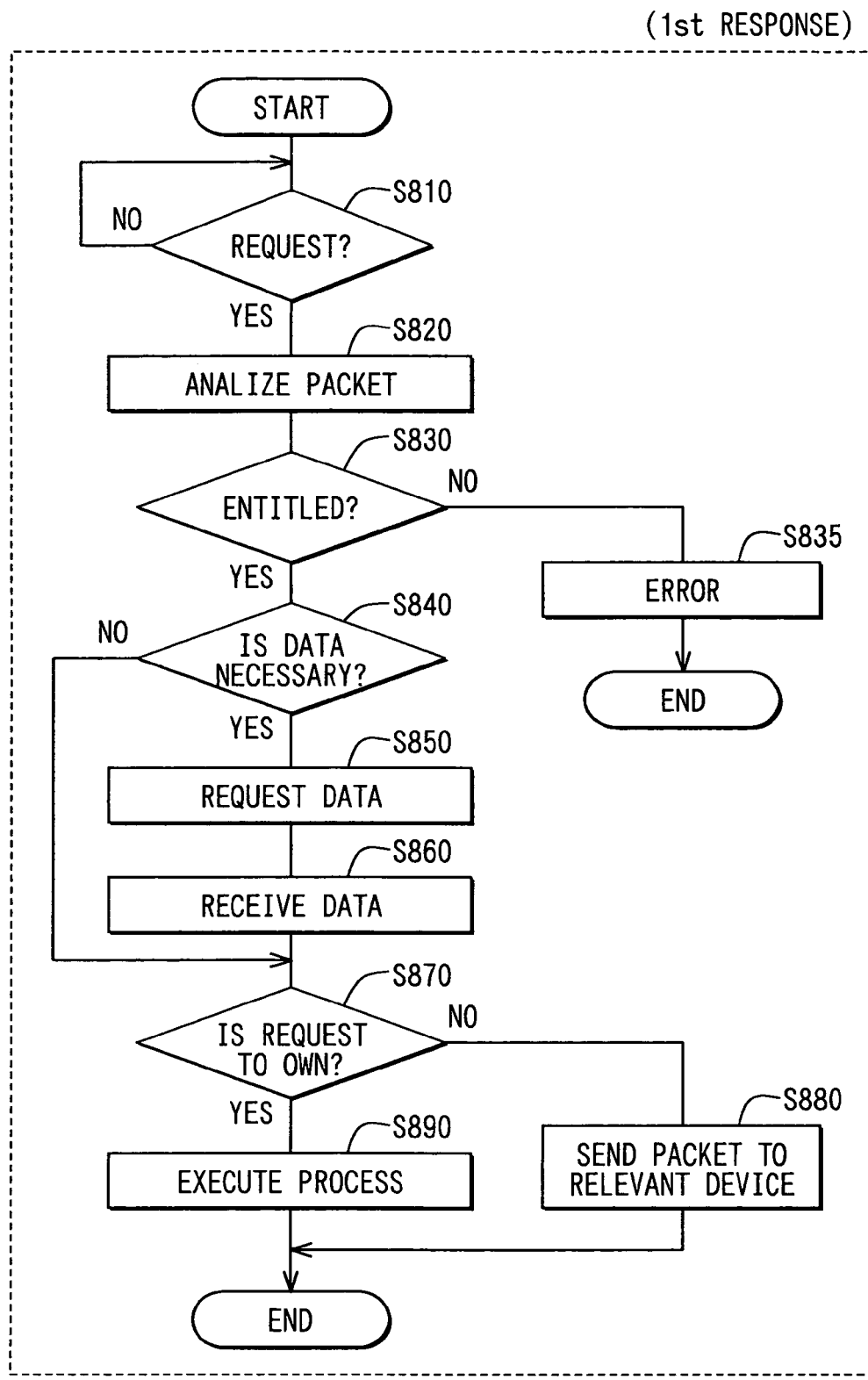
FIG. 12 is a flow chart diagram showing a first response process executed by a management device.

By contrast, the management device 37 responds to the process request packet sent from the terminal device 40 in a first response process shown in FIG. 12. FIG. 12 is a flow chart diagram showing this first response process executed by the CPU 38 of the management device 37.

Upon starting the first response process, the CPU 38 of the management device 37 waits until a process request packet is received from the terminal device 40 via the communications device 31 (S810). Upon receiving the process request packet (YES at S810), the CPU 38 analyzes the packet (S820) to determine whether the packet is sent from the terminal device 40 of the user who is entitled for executing the process based on the information of the authentication code, access code or the like included in the packet (S830). When it is determined that the packet is not sent from the user entitled (NO at S830), an error process is executed (S835) to then terminate the first response process.

By contrast, when it is determined that the packet is really sent from the user entitled (YES at S830), the CPU 38 of the management device 37 proceeds the process to S840, where it is determined whether the process code included in the packet needs obtaining a data file from the terminal device 40. When this determination is negated (NO at S840), the process advances to S870; when affirmed (YES at S840), to S850. At S850, the relevant data file is obtained from the terminal device 40 (S860), which then advances the process to S870.

At S870, the CPU 38 of the management device 37 determines whether it is determined whether the device code included in the packet is a device code possessed by the management device itself 37. When this determination is negated (NO at S870), the process request packet is sent to the device within the in-vehicle network 10 corresponding to the device code (S880). Here, when a data file is also received from the terminal device 40, the data file is attached with the process request packet.

By contrast, when it is determined that the device code included in the packet is a device code possessed by the management device itself 37 (YES at S870), the process corresponding to the target code and action code is executed (S890).

Figure 13A:
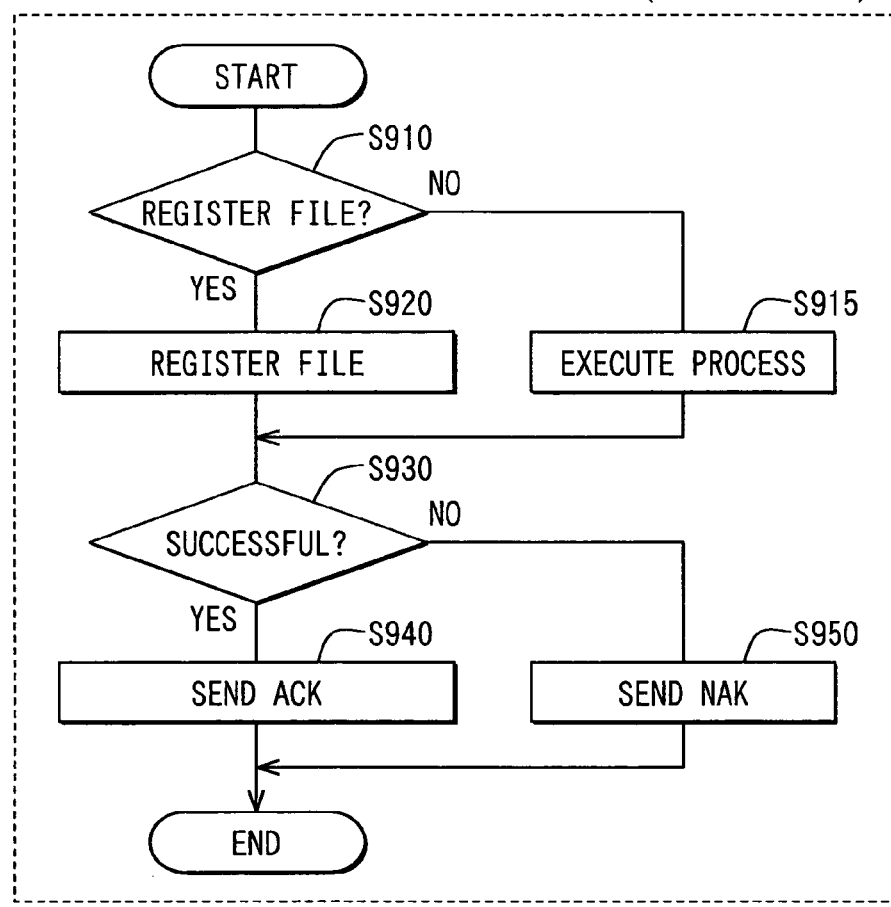
FIG. 13A is a flow chart diagram showing a second response process executed by a management device.
Figure 13B:
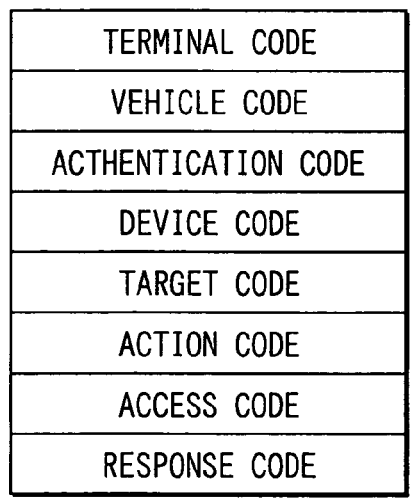
FIG. 13B is a diagram explaining a structure of a process response packet.

In detail, the CPU 38 of the management device 37 executes a second response process at S890, which is shown in FIG. 13A. FIG. 13A is a flow chart diagram showing this second response process executed by the CPU 39 of the management device 37. FIG. 13B is a diagram explaining a structure of a process response packet that is sent from the management device 37 to the terminal device 40.

Upon starting the second response process, the CPU 38 of the management device 37 determines whether the action code is for registering the data file (S910). When it is determined that the action code is for registering the data file (YES at S910), the data file received is registered with the directory within the database device 36 corresponding to the target code (S920). Here, when the action code is for registering a date file, a target code includes a code indicating a directory with which the data file is registered.

Thereafter, the CPU 38 of the management device 37 determines whether registering the data file is successfully completed (S930). When this determination is affirmed (YES at S930), a process response packet storing as a response code an ACK (Acknowledgement) code indicating the successful process completion is generated and sent to the terminal device 40 (S940). Here, the process response packet includes a response code in addition to the process request packet, as shown in FIG. 13B.

By contrast, when registering the data file is determined to be not successfully completed (NO at S930), a process response packet storing as a response code a NAK (Negative acknowledgement) code indicating the not successful process completion is generated and sent to the terminal device 40 (S950). The second response process is then terminated.

Further, when it is determined that the action code is not for registering the data file (NO at S910), a given process corresponding to the action code is executed (S915). Thereafter, the CPU 38 of the management device 37 determines whether the given process is successfully completed (S930). When this determination is affirmed (YES at S930), a process response packet storing as a response code an ACK (Acknowledgement) code indicating the successful process completion is generated and sent to the terminal device 40 (S940). The second response process is then terminated.

Figure 14:
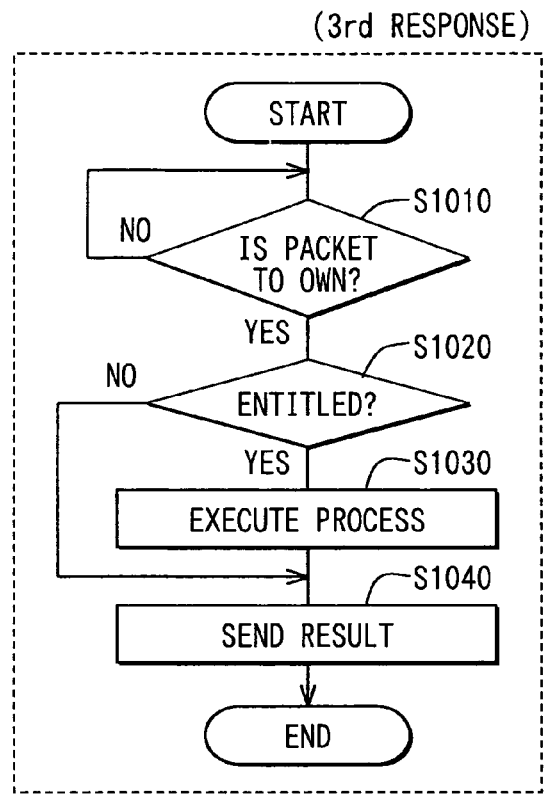
FIG. 14 is a flow chart diagram showing a third response process executed by an in-vehicle device.

By contrast, the device within the in-vehicle network 10 to which the management device 37 sends the process request packet at S880 executes a third response process to perform a given process according to the process code. This third response process being executed by the respective devices (e.g., door ECU 23) is shown in FIG. 14 regarding its flow chart.

Upon starting the third response process, a certain device of the devices within the vehicle waits until a process request packet addressed to the certain device is received (S1010). When the process request packet is received (YES at S1010), it is determined whether the packet is sent from the terminal device 40 of the user who is entitled for executing the process based on the information of the authentication code, access code or the like included in the packet (S1010). When it is determined that the packet is really sent from the user entitled (YES at S1020), the process corresponding to the target code and action code is executed (S1030). Thereafter, a result of executing the process is sent to the management device 37 (S1040), which then terminates the third response process. Here, the result of executing the process includes success or failure from executing the process, and the state of the certain device after executing the process. By contrast, when it is determined that the packet is sent not from the user entitled (NO at S1020), the certain device sends to the management device 37, as a result, the information indicating that the process corresponding to the process code is not successfully executed. The third response process is then terminated.

For example, when the door ECU 23 receives the process code as shown in CASE 1 in FIG. 10 from the management device 37, an actuator is activated to execute lock or unlock of the entire doors at S1030. The result of the process (i.e., result of switching lock or unlock) is then sent to the management device 37 (S1040).

Further, when the door ECU 23 receives the process code as shown in CASE 3 in FIG. 10 from the management device 37, the states (lock/unlock) of the doors are monitored at S1030. Of the result of monitoring, the information indicating the states of the doors is then sent as a result to the management device 37 (S1040).

Figure 15:
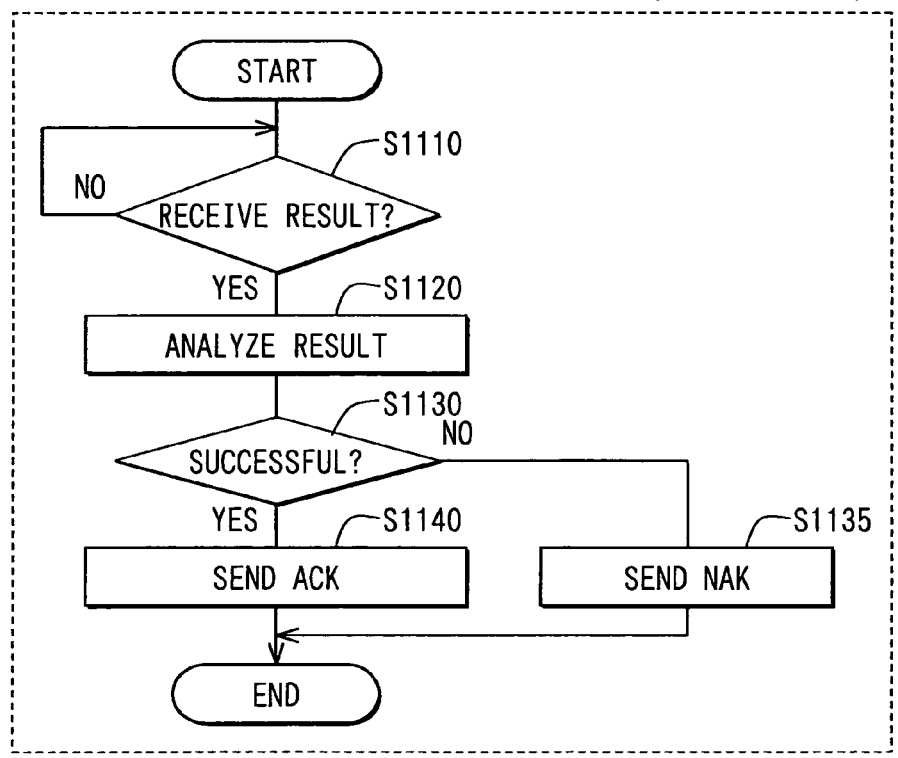
FIG. 15 is a flow chart diagram showing a fourth response process executed by a management device.

Meanwhile, when forwarding the process request packet to other devices at S880, the management device 37 executes a fourth response process as shown in FIG. 15. FIG. 15 is a flow chart diagram showing this fourth response process executed by the CPU 38 of the management device 37.

Upon starting the fourth response process, the CPU 38 of the management device 37 waits until the result of executing is received from the device corresponding to the process request packet (S1110). When it is determined that it is received (YES at S1110), the result is analyzed (S1120) and then it is determined whether the process of the device corresponding to the process request packet is successfully completed (S1130). When the process is determined to be not successfully completed (NO at S1130), a process response packet storing as a response code a NAK (Negative acknowledgement) code indicating the unsuccessful process completion is generated and sent to the terminal device 40 (S1135).

By contrast, when it is determined that the process is successfully completed (YES at S1130), a process response packet storing a response code is generated and sent to the terminal device 40 (S1140). Here, the response code includes an ACK (Acknowledgement) code indicating the successful process completion and a state code indicating the state of the device posterior to the completion of the process. The fourth response process is then terminated.

Figure 6B:
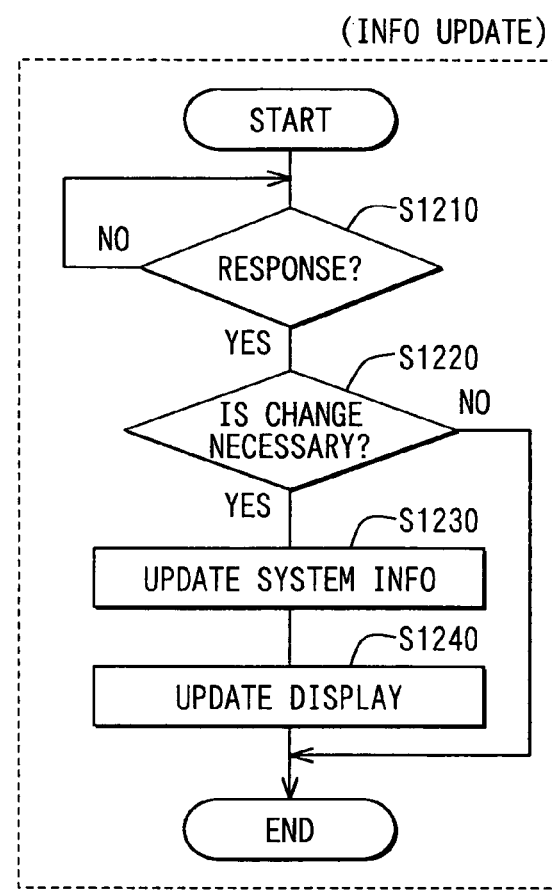
FIG. 6B is a flow chart diagram showing an information update process executed by a terminal device.

Meanwhile, the terminal device 40 executes an information update process shown in FIG. 6B when receiving the process response packet sent from management device 37. The flow chart in FIG. 6B is executed by the CPU 41 of the terminal device 40.

Upon starting the information update process, the CPU 41 of the terminal device 40 waits until the process response packet is received from the management device 37 (S1210). When it is determined that the packet is received (YES at S1210), it is determined whether the device information presently displayed needs updating by the execution of the relevant device in response to the process request packet based on the information relating to the response code included in the process response packet (S1220).

Here, when updating is determined to be needed (YES at S1220), the CPU 41 of the terminal device 40 replaces the device information descried in the system information based on the response code for the device information upon which the result of execution is reflected (S1230), further displaying on the display device 47 the device information upon which the result of execution is reflected, instead of the device information previously displayed (S1240).

For example, when receiving the process response packet including the ACK code in the response code as the response signal of the process request packet relating to the door lock/unlock, the CPU 41 of the terminal device 40 switches the device information displayed in the rightmost of "Door Lock" between "ON" and "OFF."

Further, when receiving the process response packet including the ACK code in the response code as the response signal of the process request packet relating to confirming the state of the door, the CPU 41 of the terminal device 40 displays the device information ("ON" or "OFF") in the rightmost of "Door Lock."

Thus, the information processing system 1 of this embodiment is explained above. According to the system 1, the management device 37 obtains a user ID and password as identification information of a user from the terminal device 40, identifying the user based on the identification information. Based on switch information of the user group to which the user belongs, a display target for items and device information is selected (S425); the device information corresponding to the display target is collected from the relevant device such as a door ECU 23 (S430); and system information is generated to store the items selected and device information collected (S440). Thereafter, the generated system information is sent to the terminal device 40 (S450), so that the items and device information as the display target are hierarchically displayed on the display device connected with the terminal device 40.

According to the information processing system 1, a display form for device information can be changed based on a standpoint of a user such as a vehicle owner, and a service person, so that the device information unnecessary or inappropriate for showing the user is not displayed on the display device 47. Further, the device information is displayed in a hierarchical structure, so that the devices within the relevant vehicle can be easily shown to the user.

Further, the terminal device 40 determines whether a symbol corresponding to a displayed item is clicked or whether a symbol of a data file is dropped (S610, S710) based on manipulation information of a user obtained from the input device 49 as a manipulating unit, thereby determining whether the displayed information is selected by the user. When the symbol corresponding to the item is determined to be clicked or the data file is determined to be dropped, the process code of the item related with the information is sent to the management device 37, thereby causing a given process corresponding to the process code to be executed.

Accordingly, when preferring change in a device state or the like by confirming the device information displayed on the display device 47, the user can easily operate the relevant device within the vehicle by only manipulating the input device 49 of the terminal device 40 to click the symbol of the item displayed on the display device 47. Namely, the user can easily execute a remote operation for the device within the vehicle (e.g., door ECU 23).

In particular, a process code corresponding to an item is designated depending on a user group, so that a process executed by a device when a symbol of an item displayed is selected is varied according to the user group logging in. A remote operation can be thereby applied to the vehicle according to the user, which enhances usability.

For example, it is supposed that multiple user groups are prepared in the information processing system 1, such as "vehicle owner," "guest," "service person," "maker" or the like for switching processes executed by a relevant device. The vehicle owner can be thereby prohibited from executing processes needing specialist knowledge such as setting highly professional device, while the service person or the maker can be allowed to perform a vehicle diagnosis, repairing, or the like by a remote operation. Further, the vehicle owner can be entitled to execute a remote operation for an air-conditioner or doors, which provides the user with the highly convenient information processing system 1.

Further, when obtaining the result of execution from a device executing the process (S1110), the management device 37 of this embodiment sends to the terminal device 40 a process response packet including a response code indicating the result of execution (S1140). Device information upon which the result of execution is reflected is thereby substituted for device information previously displayed on the display device 47. Accordingly, the user can confirm the result of execution on the display device 47.

Furthermore, in the information processing system 1, a data file (music data can be reproduced in an audio device 34 mounted on a vehicle) is stored in the hard disk drive 43 as a data storing unit included in the terminal device 40 that is located outside the vehicle. When the symbol of the data file is dropped on a symbol ("Music data") under "My Car" on the screen of the display device 47 via the input device 49 such as a pointing device capable of drag-and-drop operation, the terminal device 40 uploads to the vehicle the data file corresponding to the symbol on which the symbol of the data file is dropped (S770). A given process using the data file is thereby executed by the device corresponding to the device code. For instance, the given process includes registering music data with a directory of the database device 36 that can be read from the audio device 34.

As a result, the user of the relevant information processing system 1 can provide the device within the vehicle with the data file through the drag-and-drop operation, causing the device within the vehicle to execute the process using the data file. Namely, the user does not need to transfer the data file to the device within the vehicle using a flexible disk or a memory card. For instance, even when the terminal device 40 outside of the vehicle obtains a program file for an in-vehicle device from a maker or the like through the Internet, a CD-ROM, or the like, the program file can be easily installed to the in-vehicle device.

Further, since the music data or the like stored in the terminal device 40 can be easily registered with a directory of the database 36 that the in-vehicle audio device 34 can read, music data provided by the web site of the Internet can be easily reproduced by being downloaded through the terminal device 40.

Further, when a process request packet is received, it is determined whether the packet is sent from the terminal device 40 of a user who is entitled to execute a process code described in the packet (S1020). When it is determined that the packet is not sent from the terminal device 40 of the user entitled (NO at S1020), the process corresponding to the process code described in the packet is not executed. Therefore, unless the user entitled sends a process request packet in a rightful manner, the relevant process cannot be executed, so that the device within the vehicle can be prevented from being unlawfully operated.

Further, the in-vehicle network 10 and the terminal device 40 communicate with each other through the wide area network 3; however, they can communicate with each other directly through a wireless communications or wired communications.

In this embodiment, a Step S230 executed by the CPU 38 of the management device 37 primarily achieves an identification information obtaining unit; a Step S425 executed by the CPU 38 of the management device 37 primarily achieves an information selecting unit; and a Step S430 and the fourth response process (S110 to S1140) executed by the CPU 38 of the management device 37 primarily achieve an information collecting unit. Further, Steps S440 to S450 executed by the CPU 38 of the management device 37, and a Step S320, an information display process (S510 to S520), and an information update process (S1210 to S1240) executed by the CPU 41 of the terminal device 40 primarily achieve a display controlling unit.

Furthermore, Steps S610, S710 executed by the CPU 41 of the terminal device 40 primarily achieve a selection determining unit; the first response process (S610 to S650) and second response process (S710 to S770) executed by the CPU 41 of the terminal device 40 primarily achieve a device activating unit; and Steps S330, S340 executed by the CPU 41 of the terminal device 40 primarily achieve a symbol displaying unit. In addition, Step S1020 executed by an in-vehicle device primarily achieves a permission determining unit and a prohibiting unit.

It will be obvious to those skilled in the art that various changes may be made in the above-described embodiments of the present invention. However, the scope of the present invention should be determined by the following claims.

What is claimed is:

1. An information processing system for displaying, on a display device, device operation state information including information indicating an operation state with respect to at least one of a plurality of in-vehicle devices mounted on a vehicle, the information processing system comprising:
   an identification information obtaining unit that obtains identification information of a user;
   an information selecting unit that selects a display target that is to be displayed on the display device based on the identification information of the user obtained;
   an information collecting unit that collects, from the vehicle, device operation state information corresponding to the display target selected;
   a display controlling unit that causes the display device to hierarchically display the device operation state information collected, by hierarchically classifying the device information collected;
   a selection determining unit that determines whether a device operation state information item of a plurality of device operation state information items included in the device operation state information displayed is selected, based on manipulation information generated by a manipulating unit that is manipulated by the user and then generates the manipulation information; and
   a device activating unit that causes, when a certain device operation state information item of the plurality of device operation state information items is determined to be selected, a certain in-vehicle device corresponding to the certain device operation state information item selected to execute a certain process,
   the plurality of in-vehicle devices including an in-vehicle device included in at least one of a power train system, a body system, and a safety system, and an information system including an audio device.

2. The information processing system of claim 1,
   wherein the collecting unit is constructed to obtain a result from executing the certain process by the certain in-vehicle device, and
   wherein, when the collecting unit obtains the result from executing the certain process by the certain in-vehicle device, the display controlling unit causes the display device to display a device operation state information item indicating contents of the result obtained by replacing the certain device operation state information item that is previously displayed.

3. The information processing system of claim 1, further comprising:
   a switch information storing unit that stores switch information for switching processes executed by at least the certain in-vehicle device, according to the user,
   wherein the device activating unit causes, based on the switch information stored in the switch information storing unit and the identification information of the user that is obtained by the identification information obtaining unit, the certain in-vehicle device to execute a process corresponding to the user.

4. The information processing system of claim 1, further comprising:
a data storing unit that stores data that is to be processed by at least the certain in-vehicle device; and
a symbol displaying unit that displays a symbol indicating the data stored by the data storing unit,
wherein the manipulating unit includes a user interface enabling, on a screen of the display device, a drag-and-drop manipulation for the symbol displayed,
wherein, when the symbol displayed is dragged and dropped, via the user interface manipulated by the user, on a display region of the certain device operation state information item displayed on the screen, the selection determining unit determines that the certain device operation state information item is selected,
wherein, when it is determined that the certain device operation state information item is selected by the selection determining unit, the device activating unit causes the certain in-vehicle device to execute, by providing the data corresponding to the symbol dropped, the certain process using the data corresponding to the symbol dropped.

5. The information processing system of claim 4,
wherein the in-vehicle devices include at least a given in-vehicle device that manages data stored in an in-vehicle storing unit provided within the vehicle, and
wherein, when the certain in-vehicle device corresponds to the given in-vehicle device that manages data, the device activating unit causes the certain in-vehicle device to execute, by providing the data corresponding to the symbol dropped, storing of the data that is provided in the in-vehicle storing unit.

6. The information processing system of claim 1, further comprising:
a permission determining unit that determines whether the user is permitted to cause the certain in-vehicle device to execute the certain process; and
a prohibiting unit that prohibits, when the user is determined to be not permitted, the certain in-vehicle device from executing the certain process.

7. An in-vehicle device information displaying method for a user who has a display device where device operation state information with respect to at least one of a plurality of in-vehicle devices mounted on a vehicle is displayed, the in-vehicle device information displaying method comprising steps of:
obtaining identification information of a user;
selecting a display target that is to be displayed on the display device based on the identification information of the user obtained;
collecting, from the vehicle, device operation state information corresponding to the display target selected; and
causing the display device to hierarchically display the device operation state information collected, by hierarchically classifying the device operation state information collected;
determining whether a device operation state information item of a plurality of device operation state information items included in the device operation state information displayed is selected, based on manipulation information generated by a manipulating unit that is manipulated by the user and then generates the manipulation information; and
causing, when a certain device operation state information item of the plurality of device operation state information items is determined to be selected, a certain in-vehicle device corresponding to the certain device operation state information item selected to execute a certain process,
the plurality of in-vehicle devices including an in-vehicle device included in at least one of a power train system, a body system, a safety system, and an information system including an audio device.

8. The information processing system of claim 1, wherein the power train system includes at least one of electronic control units relating to traveling of the vehicle.

9. The information processing system of claim 1, wherein the body system includes at least one of at least one of electronic control units relating to an air-conditioner and a door.

10. The information processing system of claim 1, wherein the safety system includes at least one of at least one of electronic control units for aiming at safety of the vehicle and anti-theft.

11. The information processing system of claim 1, wherein the information system further includes at least one of a navigation device, a display device, a user interface, a database device, a wireless communications device, and a management device.

* * * * *